United States Patent

[11] 3,631,512

[72] Inventor John L. Janning
Dayton, Ohio
[21] Appl. No. 17,762
[22] Filed Mar. 9, 1970
[45] Patented Dec. 28, 1971
[73] Assignee The National Cash Register Company
Dayton, Ohio

[54] SLAVE PRINTING APPARATUS
8 Claims, 14 Drawing Figs.

[52] U.S. Cl. .......... 346/76 R, 219/216, 340/324 R, 346/33 A
[51] Int. Cl. .......... G01d 15/10
[50] Field of Search .......... 346/76, 33 A, 74 P; 340/324, 173; 219/216

[56] References Cited

UNITED STATES PATENTS

| | | | |
|---|---|---|---|
| 2,951,121 | 8/1960 | Conrad | 346/76 X |
| 3,090,828 | 5/1963 | Bain | 346/33 A X |
| 3,240,114 | 3/1966 | Jonker et al. | 346/107 X |
| 3,413,647 | 11/1968 | Polster et al. | 346/139 C X |
| 3,471,861 | 10/1969 | Macouski | 346/74 P |
| 3,475,552 | 10/1969 | Makino et al. | 346/74 P X |

FOREIGN PATENTS

| | | | |
|---|---|---|---|
| 1,157,228 | 7/1969 | Great Britain | 219/216 |

*Primary Examiner*—Joseph W. Hartary
*Attorneys*—Louis A. Kline, Albert L. Sessler, Jr. and Elmer Wargo ABSTRACT: An apparatus for producing character patterns which includes a first matrix, or "master" unit, of selectively energizable components (like resistors and electric lamps) which are arranged in a first array for producing a plurality of character patterns. A second matrix, or "slave" unit, which is easily replaceable, has selectively energizable second components (like resistors for printing on a thermally responsive medium, or light cells for printing on a light-responsive medium), which are arranged thereon in a second array for producing character patterns corresponding to those produced by the first matrix. A sensing element (like a semiconductor with a high negative coefficient of resistance, or a light-sensitive semiconductor) is associated with each component of the first matrix, and this sensing element is effective to energize the associated component of the second matrix whenever the corresponding component of the first matrix is energized. Regardless of the number of energizable components present on the second matrix, only two connection leads for connection to a source of potential are required for the second matrix, making it easily replaceable when subjected to wear in cooperative association with a printing medium (like thermally or photographically responsive paper).

INVENTOR
JOHN L. JANNING

BY

Louis A Kline
Albert L Seasler, Jr
Elmer L Wargo

HIS ATTORNEYS

INVENTOR
JOHN L. JANNING

BY Louis A. Kline
Albert L. Sessler, Jr.
Elmer Wargo
HIS ATTORNEYS

INVENTOR
JOHN L. JANNING
BY Louis A Kline
Albert L. Segeler, Jr.
Elmer Vargo
HIS ATTORNEYS INVENTOR
JOHN L. JANNING
BY Louis A. Kline
Albert L. Sessler, Jr.
Elmer Wargo
HIS ATTORNEYS

SLAVE PRINTING APPARATUS

BACKGROUND OF THE INVENTION

This invention generally relates to an apparatus for producing character patterns (like a printing device) and is more specifically related to an easily replaceable "slave" printing unit which is operatively coupled to a "master" printing unit.

In conventional thermal printing, a thermally responsive record medium is placed in contact with a thermal print head. The print head has a plurality of resistors mounted thereon in a predetermined pattern. When selected ones of the resistors are energized in the form of a predetermined character, the energized resistors dissipate heat in localized areas. The localized areas of heat on the print head activate the thermally responsive record medium in contact therewith, causing a color change in the affected areas, thereby producing the predetermined character on the record medium.

One of the problems associated with a conventional thermal printing apparatus described in the previous paragraph is that the plurality of resistors on the print head is eventually worn away due to the abrasiveness of the record medium brought into contact with the print head, thereby rendering it inoperative. Because fabricating such a print head is complex and expensive, replacing it is expensive. Due to the complexity of the print head itself, a very skilled operator is required to replace it.

In contrast with conventional thermal printing apparatuses, the apparatus of this invention includes a first matrix, or "-master" printing unit, which rarely needs replacing, and a second matrix, or "slave" unit, which is easily replaceable. The second matrix is also simple to fabricate and is low in cost. Only two electrical connection terminals are required on the second matrix, regardless of the number of components (like resistor elements) to be energized thereon. Such connection simplicity makes replacement of the second matrix easy for an unskilled operator. Because the second matrix is easily replaceable, it can be made in a variety of fonts or design styles for use with a single first matrix, or "master" unit. The second matrix also eliminates the necessity for multilayer depositions, and multilevel interconnections that are encountered with prior art print head apparatuses.

SUMMARY OF THE INVENTION

This invention relates to an apparatus for producing character patterns. It includes a first matrix, or "master" unit, having a plurality of selectively energizable components thereon which are arranged in a first array for producing a plurality of character patterns. It also includes a second matrix, or "slave" unit, having a plurality of selectively energizable components arranged in a second array corresponding to the first array and adapted to be energized in a plurality of patterns corresponding to the patterns of the first matrix. Each of the second components has associated therewith an energizing means for energizing it in response to the energization of the corresponding first component on the first matrix.

DESCRIPTION OF THE PREFERRED EMBODIMENT

Figure 1:
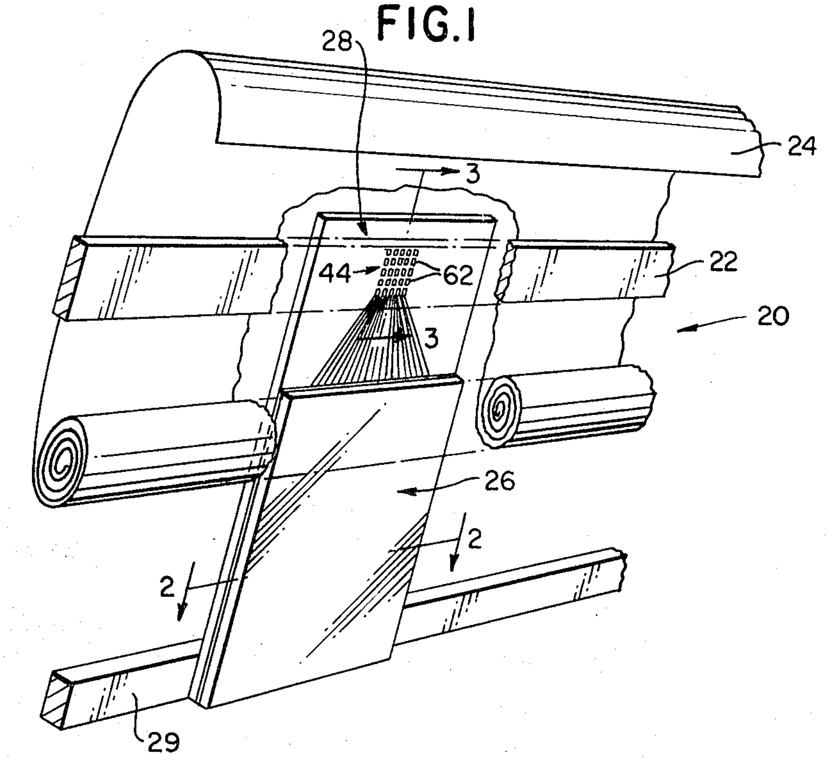
FIG. 1 is a general view in perspective of one embodiment of the printing apparatus of this invention showing a first matrix for producing character patterns and a second matrix, or "slave" unit, in cooperative association with the first matrix and a printing medium.

This invention, in one embodiment, may be utilized in a printing apparatus of the type depicted generally in perspective in FIG. 1. The apparatus, designated generally as 20, includes a platen 22, which supports a record medium 24, which is advanced by conventional means (not shown).

The apparatus 20 (FIG. 1) also includes a first matrix, or "-master" unit, designated generally as 26, and a second matrix, or "slave" unit, designated generally as 28, which are conventionally supported on a support 29. In one embodiment of the invention, the first matrix 26 has a plurality of separately energizable components like groups 30 of resistors thereon, which resistors are arranged in an array from which a plurality of characters may be formed.

Figure 4:
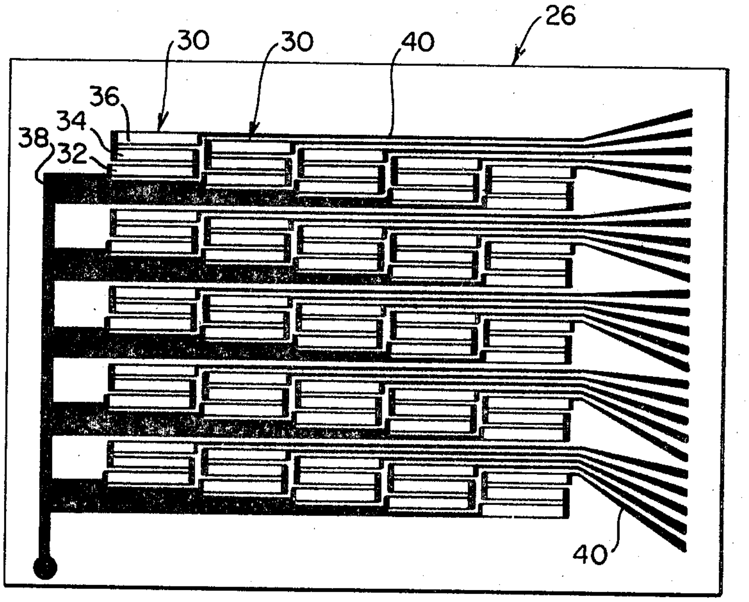
FIG. 4 is a plan view of one embodiment of the first matrix, showing first components (planar resistors) which are selectively energizable to produce localized areas of heat in a character pattern.

The first matrix 26 (FIG. 4) may be a conventional thermal print head which is energized conventionally. Each group 30 of resistors is composed of three series connected resistors (like 32, 34, and 36), with one end of the resistor 32 being connected to a common conductor 38 and one end of the resistor 36 being connected to a conductor 40 for energizing the particular group 30 of resistors. The conductors 40 and the common conductor 38 are connected to a conventional printing device (not shown), which energizes the appropriate conductors 40 to energize the corresponding groups 30 of resistors and thereby produce a desired character pattern. In a typical thermal printing arrangement, a thermally responsive record medium (not shown) is placed in contact with the matrix 26 to effect the printing; however, in the present invention, the first matrix, or "master" unit, 26 is placed in proximity with the second matrix, or "slave" unit, 28 to energize it.

There are a variety of techniques by which the second matrix may be coupled to the first matrix to be energized thereby. FIGS. 1 through 5 show one technique for an embodiment which is thermally coupled.

Figure 5:
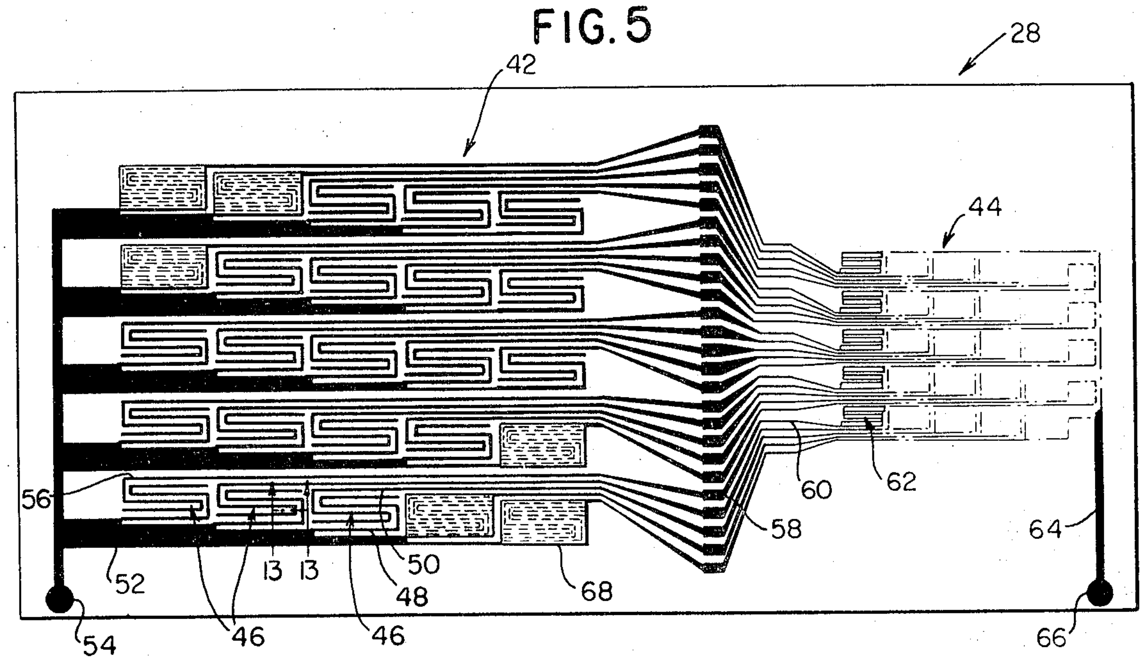
FIG. 5 is a plan view of one embodiment of the second matrix, or "slave" unit, which is coupled electrically to a first matrix (not shown) by semiconductor energizing means.

The second matrix, designated generally as 28 in FIG. 1, has a coupling portion and a printing portion, designated generally as 42 and 44, respectively (as shown in FIG. 5). The coupling portion 42 is composed of pairs 46 of conductor elements, which are arranged in a configuration corresponding to the groups 30 of resistors shown on the first matrix 26, shown in FIG. 4. Each pair 46 includes a first conductor element 48 and a second conductor element 50. These elements have therein a plurality of reverse bends enabling the elements to be positioned in spaced, side-by-side relationship with each other while being fitted compactly within a small area. The conductor elements 48 and 50 of each pair 46 remain unconnected but are covered with a layer of semiconductor material. The conductor elements 48 and 50 may typically be about 1 mil wide, with the spacing between the first and second conductor elements being about 10 microns. The first and second conductor elements are made long and narrow, so as to decrease the resistance of the pair of elements with semiconductor material thereon to a usable operating range whereby the resistance will be low in the active state and high in the inactive state compared to the resistance of a group of resistors of the printing portion 44. As an example, in one embodiment of the second matrix, the resistance of each group 62 of resistors (FIG. 5) is about 300 ohms. The impedance of the corresponding coupling portion 42 should be at least an order of magnitude higher in the inactive state (like 3,000 ohms) and at least an order of magnitude lower in the active state (like 30 ohms) compared to the resistance of the associated group 30 of resistors. These conductor elements may be made of gold which is deposited by conventional techniques. The first conductor element 48 of each pair is connected to a common conductor, like 52, which in turn is connected to a common terminal 54. Each second conductor element 50 of a pair 46 is connected in series with a corresponding group of resistors on the printing portion 44 of the second matrix 28. For example: The pair 46 of conductor elements located in the lower left-hand corner of the matrix of the coupling portion 42 (as viewed in FIG. 5) has its second conductor element, marked 56, connected to a terminal 58. A conductor 60 connects the terminal 58 to the group of resistors (marked as 62) which is located in the lower left-hand corner of the printing portion 44. The printing portion 44 is a printing matrix which is identical to the first matrix 26 (FIG. 4) except that the printing portion 44 is smaller. Each of the groups of resistor elements like 62 (FIG. 5) has one conductor (like 60) connected to the second conductor of a pair of conductor elements, like 46, as just described, and the remaining conductor of the group of resistor elements is connected to a common conductor 64 ending in a common terminal 66. The terminals 54 and 66 are the only terminals needed to connect the second matrix 28 to a source of electrical potential regardless of the number of groups 30 of resistors included in the first matrix 26.

The second matrix 28 is coupled to the first matrix 26 in one embodiment by the following construction. The conductor elements (48 and 50) for each pair 46 (FIG. 5) may be made of gold and are covered by a layer of semiconductor material having a high, negative-temperature coefficient of resistance. The particular layer of semiconductor selected and its thickness are dependent upon the particular control requirements of a specific application. Because the control requirements can be satisfied by conventional techniques, the specific materials or thicknesses deposited are not described in detail. As an illustration, each pair 46 of conductor elements may be covered with a layer 68 (FIG. 5) of cadmium selenide (shown as a rectangle having dashed lines therein). Each pair 46 of conductor elements has its own discrete layer of cadmium selenide deposited thereon, which layer is about one-half micron in thickness. Other materials which may be used for the layer of semiconductor material are silicon, germanium, and cadmium sulfide, to name a few examples.

Figure 3:
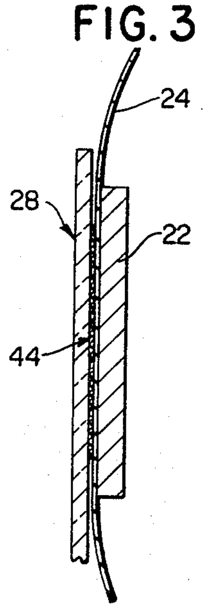
FIG. 3 is a cross-sectional view taken along the line 3—3 of FIG. 1, showing details of the second matrix in cooperative association with a printing medium.
Figure 2:
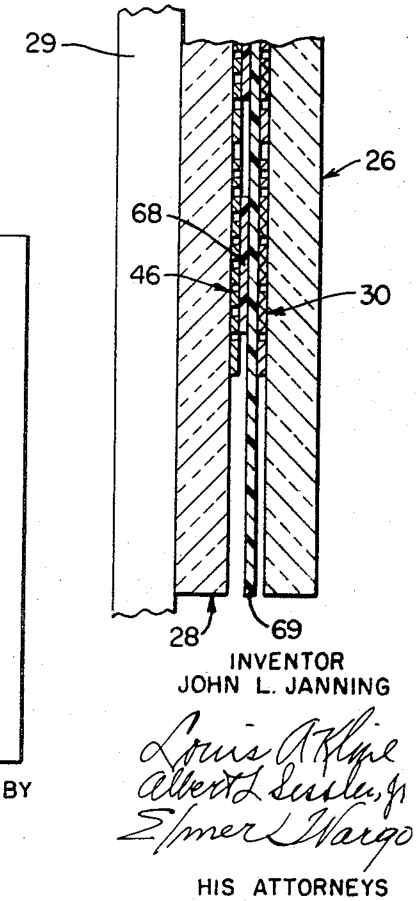
FIG. 2 is a portion of a cross-sectional view, taken along the line 2—2 of FIG. 1, showing additional details of the first and second matrices in cooperative association with each other.

The apparatus 20 shown in FIG. 1 operates in the following manner. The first matrix 26 and the second matrix 28 are juxtaposed as shown in FIGS. 1 and 2, so that a pair 46 of conductor elements on the second matrix 28 is positioned opposite to a corresponding group 30 of resistors on the first matrix 26, these two matrices being separated by a very thin layer 69 (FIG. 2) of plastic, like "Mylar" or similar material, to prevent shorting between the first and second matrices. When the layer 68 of cadmium selenide is at room temperature or in the inactive portion of a print cycle, a negligible current flows between the terminals 54 and 66 (FIG. 5), which are connected to a source of electrical potential. However, when a specific group 30 of resistors on the first matrix is energized (for the active portion of a print cycle) in response to the output from a conventional printer control circuit, the associated resistors become heated. The corresponding pair 46 (FIG. 2) of conductor elements and the layer 68 of semiconductor material opposite the heated resistors detect the addition of heat and respond thereto by lowering the resistance between the first and second conductors 48 and 50 of the pair, thereby permitting a greater quantity of current to flow through the corresponding group 62 of resistors in the printing portion 44 of the second matrix 28. The greater quantity of current flowing through the group 62 of resistors is sufficient to heat them to a temperature which is high enough to activate the thermally responsive printing medium 24 (FIGS. 1 and 3). By energizing selected groups 30 of resistors on the first matrix 26, a desired character pattern is produced on the medium 24 by the technique just described. Because of the small current flowing through the groups 62 of resistors in the printing portion 44 of the second matrix 28 during the inactive cycle, a gradual buildup of unwanted heat (due to $I^2R$ losses) may be experienced by the individual groups 62 of resistors. To avoid unwanted printing by this gradual buildup of heat in the inactive cycle, the terminals 54 and 66 of the second matrix 28 may be pulsed or energized by a clocking arrangement only during the time that printing is to be effected. As this aspect may be conventional, it is not described in detail herein.

Some of the advantages of the printing apparatus 20 just described are as follows:

a. Because the first matrix 26 does not come into contact with the record medium 24, it is not subjected to abrasion against the medium and consequently should seldom, if ever, need replacement.
b. Because the first matrix 26 is generally expensive to manufacture, it can be made larger than it normally would be. For example, the size of the first matrix may be comparable to the size of the coupling portion 42 of the second matrix 28 (FIG. 5); the printing portion 44 on this matrix 28 may be made according to the specific requirements of a particular printing application.
c. A change in optical font of the final printing may be effected by simply changing the second matrix 28 to one having the desired characteristics.
d. There are only two electrical leads (to the terminals 54 and 66, FIG. 5) connecting the second matrix 28 to the apparatus 20, making the change to a different second matrix by an inexperienced operator feasible.

Figure 6:
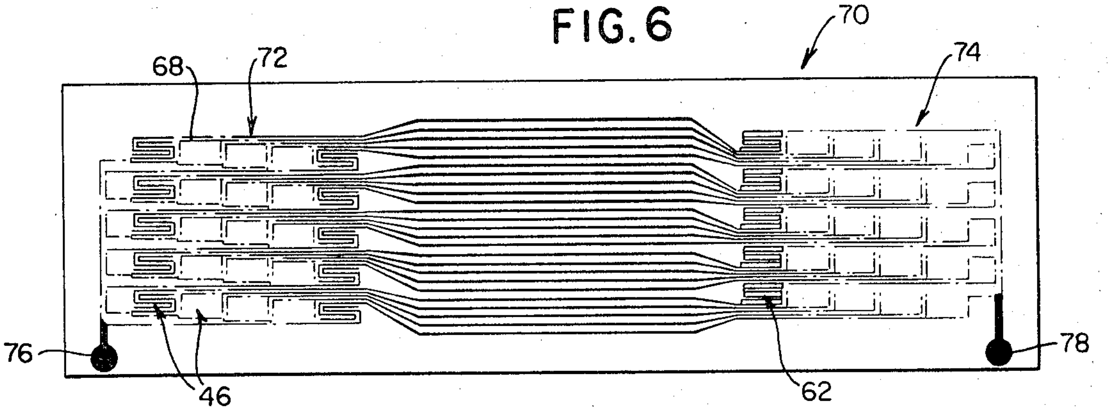
FIG. 6 is a plan view of a second embodiment of the second matrix, or "slave" unit, having different size proportions from the one shown in FIG. 5.

Another embodiment of the invention is shown in FIG. 6, which shows a second matrix designated generally as 70. The second matrix 70 has a coupling portion 72 and a printing portion 74, which are substantially the same in size. The coupling portion 72 is identical to the coupling portion 42 shown in FIG. 5 except that it is smaller. The printing portion 74 is identical to the printing portion 44 shown in FIG. 5. This embodiment 70 illustrates the fact that the coupling portion and the printing portion of the second matrix may be made to a one-to-one ratio, or any other ratio desired. Obviously, the corresponding first matrix would have to be made of a size compatible with the coupling portion 72 of the second matrix 70. As in the previous embodiment, the second matrix 70 has only two connections, which are made at terminals 76 and 78.

Figure 7:
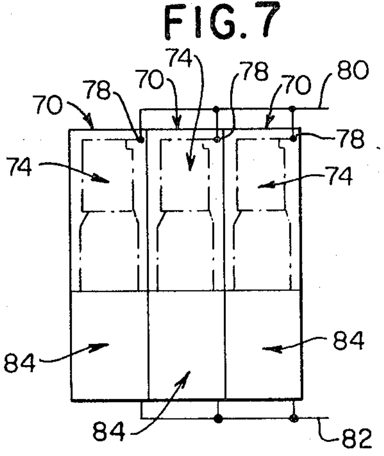
FIG. 7 is a schematic representation, showing how the individual second matrices may be connected together for multiple side-by-side operation, as might be required in a printer which prints a line at a time.

While only one printing portion like 44 in FIG. 5 is shown, several such units may be duplicated to provide a different format for printing. For example, if a line of printing is desired, several units like the second matrix 70 shown in FIG. 6 may be placed in side-by-side relation, as shown in FIG. 7. The printing portion 74 of each second matrix 70 is aligned for printing along a line, and its terminals 78 are connected to a common energizing conductor 80. The other terminal 76 (not shown in FIG. 7) of each second matrix 70 is connected to a common energizing conductor 82. Each of the second matrices 70 has its own first matrix (like 26 in FIG. 4) associated with it. The second matrices in FIG. 7 are shown merely as rectangles 84 and are positioned in cooperative association with their associated coupling portions on the second matrices 70, as previously described. The embodiment shown in FIG. 7 operates in the same manner as the one shown in FIG. 1.

Figure 8:
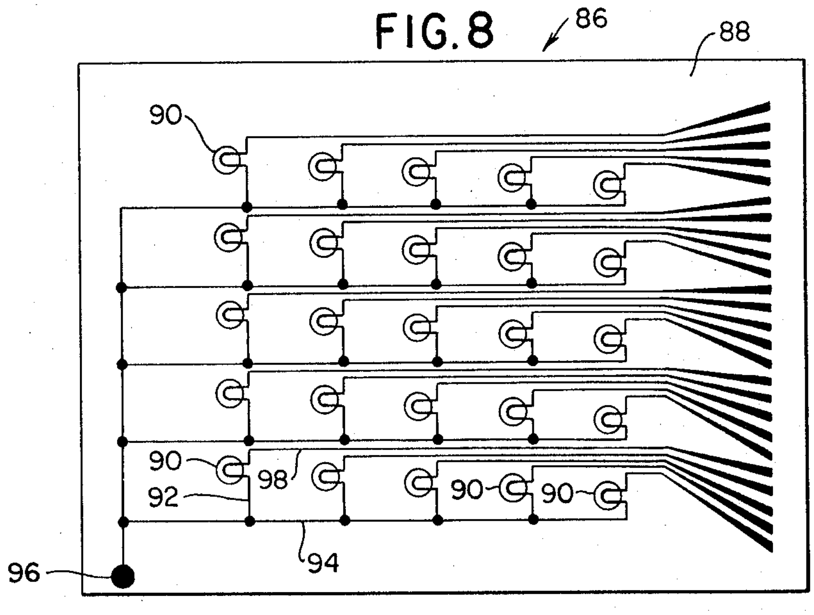
FIG. 8 is a schematic view of another embodiment of the first matrix, having lamps for its selectively energizable components.

Another technique by which the second matrix may be coupled to the first matrix to be energized thereby is by a light coupling, as shown in FIG. 8, which shows only the first matrix, designated generally as 86. The matrix 86 includes an opaque substrate 88, on which a plurality of light sources (like lamps 90) are mounted. These lamps 90 are arranged in an array similar to the array of groups 30 of resistors shown in FIG. 4. Each lamp 90 has one energizing conductor 92 connected to a common conductor, like 94, which is connected to a common terminal 96, and the other energizing conductor (like 98) is available for connection to a conventional printing device (not shown), which selectively energizes the appropriate conductors (like 98) to energize the appropriate lamps 90 to thereby produce a desired character pattern. Each of the lamps 90 may be provided with conventional surrounding light shields (not shown) to prevent unwanted cross-coupling of the lamps 90.

The second matrix of the printing apparatus which is coupled to the first matrix 86 of FIG. 8 may be identical to the second matrix 28 shown in FIG. 5, with one exception; namely, that the semiconductor material deposited on the groups 46 of conductors should be one which is responsive to changes in light. Cadmium sulfide is one such suitable semiconductor material which can be conventionally deposited on the groups 46 of conductors. The cadmium sulfide may be deposited on the associated conductors like 48 and 50 of a pair 46 (FIG. 5) to form discrete areas like the rectangles 68, as previously explained. When a particular lamp 90 (FIG. 8) is off, little or no current flows through the group 62 of resistors (FIG. 5); however, when a particular lamp 90 is energized, the associated semiconductor material (as at 68 in FIG. 5) becomes conductive to thereby energize the corresponding group 62 of resistors on the second matrix 28 to effect printing, as previously explained. The particular semiconductor material selected for use in "light coupling" as here described depends upon the particular wavelength of the light source used. Because the matching of semiconductor material with a light source may be conventional, it is not described in detail herein.

Other constructions which would enable the second matrix of the printing apparatus to be coupled to the first matrix thereof by a light coupling could be accomplished by replacing the lamps 90 of FIG. 8 with plasma display devices or light-emitting diodes. One such construction is shown in FIGS. 11 and 12.

Figure 11:
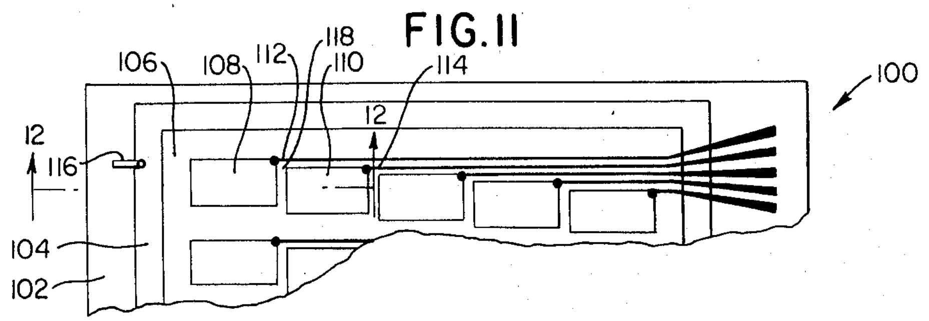
FIG. 11 is a portion of another embodiment of the first matrix, in which the selectively energizable components thereof emit light by an electroluminescent display technique.
Figure 12:
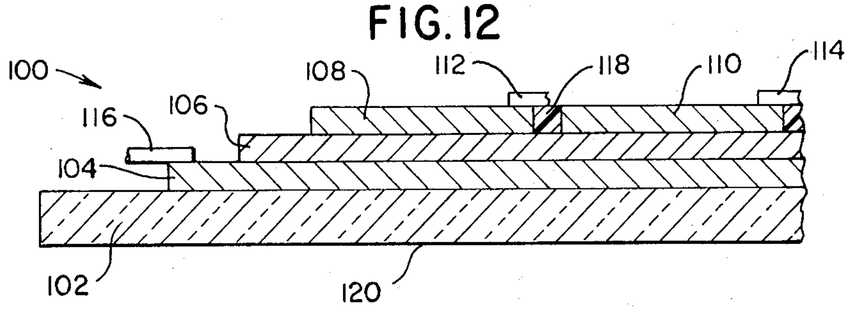
FIG. 12 is a cross-sectional view of the first matrix shown in FIG. 1 and is taken along the line 12—12 thereof.

FIGS. 11 and 12 show a portion of a first matrix, designated generally as 100, which may be made in the form of an electroluminescent panel. The matrix 100 includes a glass substrate 102, on which a layer 104 of tin oxide is deposited by conventional techniques. Over the layer of tin oxide, a layer 106 of zinc sulfide about 1,000 angstroms thick is similarly deposited. The zinc sulfide is a material which emits light or glows when subjected to an alternating electrical potential. Electrodes like 108 and 110 (which are areas of gold) are deposited on the layer 106 of zinc sulfide in those areas where light emission is desired; the placement of these electrodes corresponds to the placement of the lamps 90 in FIG. 8, for example. Each of the electrodes like 108 and 110 has its own energizing conductor like 112 and 114, respectively, connected thereto. A conductor 116 is connected to the layer 104 of tin oxide, which acts as a common conductor for all the opposing electrodes like 108 and 110. When a source of AC potential is placed on the common conductor 116 and selected ones of the conductors like 112, an emission of light occurs in the layer 106 of zinc sulfide adjacent to the electrodes (108, 110) which are energized to form individual "light cells." In order to prevent unwanted glow adjacent to the conductors like 112 and 114, a layer 118 of plastic material is deposited on the layer 106 of zinc sulfide, and the conductors like 112 and 114 are deposited thereon. The layer 118 of plastic provides sufficient spacing from the layer 106 of zinc sulfide so that the layer 106 will not glow at the areas under the conductors like 112 and 114. The side 120 (FIG. 12) of the first matrix 100 containing the glass substrate 102 is positioned next to the coupling portion like 42 of the second matrix 28 shown in FIG. 5. Naturally, the coupling portion of the second matrix selected for use with the first matrix 100 just described would be responsive to the light emitted therefrom.

Figure 13:
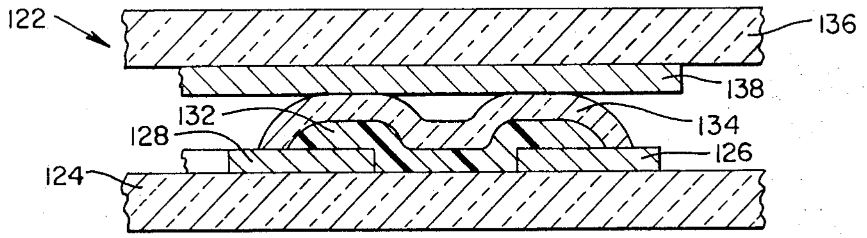
FIG. 13 is a cross-sectional view taken along the line 13—13 of FIG. 5 and showing a portion of an embodiment of first and second matrices which operate by "field effect."

FIG. 13 shows another embodiment, designated generally as 122, representing another technique (that is, field effect) by which the first matrix is coupled to the second matrix. The embodiment 122 is taken along a line similar to 13—13 of FIG. 5 and shows the first matrix and the second matrix in assembled relationship.

The second matrix shown in FIG. 13 includes a glass substrate 124, on which first and second gold conductors 126 and 128 (drain and source electrodes, respectively) are deposited. These conductors correspond to the first and second conductors 48 and 50 shown in FIG. 5, a pair of such conductors being provided for each group (like 30) of resistors of the first matrix shown in FIG. 4. A layer 132 of semiconductor material like cadmium selenide is conventionally deposited over the first and second conductors as shown, and an insulative layer 134 of glass is deposited over the layer 132 of semiconductor material.

Figure 9:
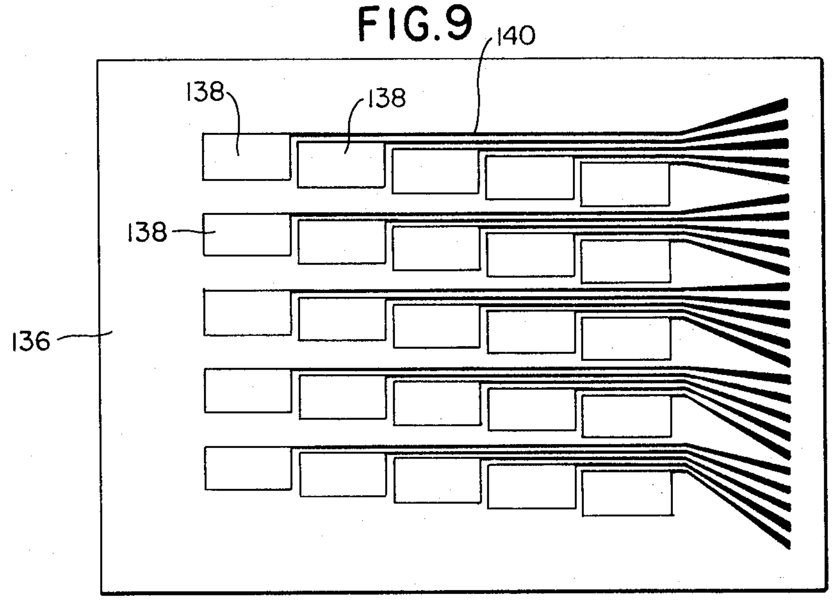
FIG. 9 is a schematic view similar to FIG. 8, showing another embodiment of the first matrix, in which the selectively energizable components thereof operate by "field effect."

The first matrix shown in FIGS. 13 and 9 includes a glass substrate 136, on which a plurality of gold conductor pads (gate electrodes) like 138 are deposited. Each pad 138 of gold is conventionally deposited on the substrate, one such pad being provided for each area where a group (like 30) of resistors was located in the embodiment shown in FIG. 4. The gold pads 138 in this embodiment of FIG. 9 correspond to the groups 30 of resistors shown in the embodiment of FIG. 4. Each pad 138 has its own conductor like 140 (FIG. 9) connected thereto, and each is positioned over a discrete area of semiconductor material.

When the first and second matrices are assembled as shown in FIG. 13, the embodiment 122 operates as follows. A positive potential of approximately 100 volts or more is placed upon each conductor 140 for the corresponding gold pads (or gate electrodes) 138 which are to be energized. The first conductors like 126 (source electrodes) of each of the pairs of the second matrix are connected to a common negative potential, and each second conductor like 128 (drain electrode) is connected in series with a corresponding group (like 62 in FIG. 5) of resistors of the printing portion (not shown) of the second matrix. The common terminal of the second matrix for all the groups (like 62 in FIG. 5) of resistors is connected to a positive potential. When a positive potential is placed on a particular gold pad 138, conduction occurs between the associated first and second conductors, as happens with field effect semiconductor devices, to thereby energize the corresponding group of resistors in the printing portion of the second matrix.

Figure 14:
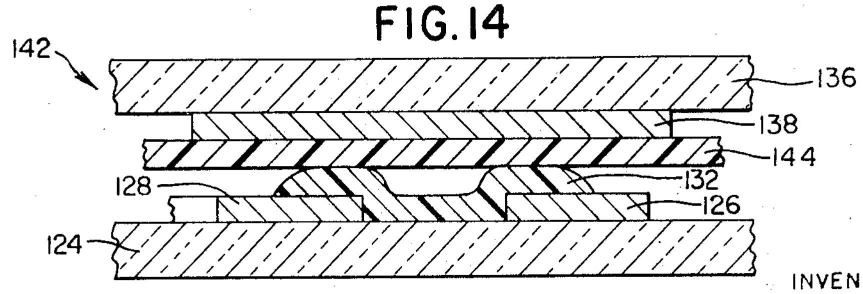
FIG. 14 is a view similar to FIG. 13, showing another embodiment of first and second matrices operating by "field effect."

FIG. 14 shows another embodiment, designated generally as 142, which represents an apparatus operating by field effect. Because the embodiment 142 is very similar to the embodiment 122, shown in FIG. 13, the same reference numerals are used for identical parts. Accordingly, the embodiment 142 has a second matrix, including a glass substrate 124, on which first and second gold conductors 126 and 128 are deposited. A layer 132 of semiconductor material, like cadmium selenide, is conventionally deposited over the first and second conductors, as shown. A thin layer 144 of plastic like "Mylar" is positioned between the layer 132 of semiconductor material and the associated gold pad 138 instead of the layer 134 of glass shown in FIG. 13. The gold pads 138 in FIG. 14 may be deposited on the glass substrate 136 of the first matrix or the pads 138 may be deposited on the side of the layer 144 of plastic which is located away from the layer 134 of semiconductor material. The embodiment 142 operates in exactly the same manner as the embodiment 122 shown in FIG. 13.

While the printing portion like 44 in FIG. 5 of the second matrix has been generally described as a "thermal print head" in the various embodiments disclosed herein, the printing portion may take forms other than that shown. For example, the printing portion of the second matrix may be conventionally altered so as to effect printing on a photosensitive record medium. For example, the printing portion of such a second matrix might include an electroluminescent display device similar to that shown in FIGS. 11 and 12, or it might include conventional light-emitting diodes (not shown). The photosensitive medium in such an arrangement would be placed against the light-emitting portion of the second matrix in the same manner as the thermally responsive record medium 24 is placed against the printing portion 44 as shown in FIG. 1. Where no permanent record is required, an electroluminescent display device alone may be utilized in the printing portion of the second matrix.

Figure 10:
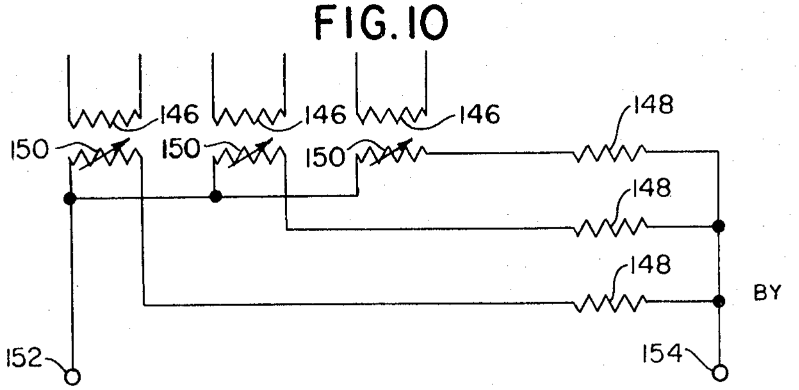
FIG. 10 is a general schematic diagram showing (in generalized form) how the selectively energizable components of the second matrix are energized.

FIG. 10 is a schematic representation of the means by which the first matrix is coupled to the second matrix of the apparatus. The coupling, for ease of illustration, is shown only as a variable resistance coupling. The individual groups (like 30 of FIG. 4) of elements on the first matrix to be energized are shown as resistors 146 in FIG. 10. The groups (like 62 in FIG. 5) of resistors on the printing portion of the second matrix are shown as resistors 148 in FIG. 10. Each resistor 146 (FIG. 10) has its own variable resistor 150 associated with it. Each variable resistor 150 has one terminal thereof connected to a common terminal 152 and its other terminal connected in series with one terminal of a corresponding resistor 148 on the printing portion of the second matrix. The remaining terminals of the resistors 148 are connected to a common terminal 154 on the second matrix. The terminals 152 and 154 are connected to a source of potential. In operation, when a resistor 146 on the first matrix is energized, the corresponding variable resistor will be lowered in resistance, thereby energizing the associated resistor 148 on the printing portion of the second matrix.

What is claimed is:

1. An apparatus for producing character patterns comprising:

a first matrix having a plurality of selectively energizable first components arranged in a first matrix-type array for producing a plurality of matrix-type character patterns; and a second matrix physically distinct from said first matrix and having a plurality of selectively energizable second components arranged in a second array corresponding to said first array and adapted to be energized in a plurality of patterns corresponding to the patterns of said first matrix;

each said second component having associated therewith a separate energizing means for energizing it in response to the energization of the corresponding first component in said first matrix; and each said energizing means being located in a third array which is located on said second matrix, with each said energizing means being located in opposed relationship with the one of said first components corresponding to the second component with which the energizing means is associated.

2. The apparatus as claimed in claim 1 in which said second matrix has only two connection terminals thereon for connection to a source of electrical potential, with each said energizing means and its associated second component being connected in series between said connection terminals.

3. The apparatus as claimed in claim 2 in which each said first component produces heat when energized, and each said energizing means is responsive to heat changes of its associated first component so as to energize the corresponding second component when the corresponding first component is energized.

4. The apparatus as claimed in claim 3 in which each said energizing means includes a semiconductor material having a negative coefficient of resistance.

5. The apparatus as claimed in claim 4 in which each said second component produces heat when energized so as to produce a mark on a thermally responsive record medium when placed in contact therewith.

6. A printing apparatus comprising:

a first matrix having a plurality of selectively energizable first components arranged in a first matrix-type array for producing a plurality of matrix-type character patterns;

a second matrix having a plurality of selectively energizable second components arranged in a second array corresponding to said first array and adapted to be energized in a plurality of patterns corresponding to the patterns of the first matrix; and a thermally responsive record medium;

said second components being resistors adapted to be heated when energized and being in operative contact with said record medium;

each said second component having associated therewith an energizing means for energizing it in response to the energization of the corresponding first component in said first matrix;

said second matrix and said energizing means being located on a separate substrate, making it easily replaceable in said apparatus; and each said energizing means being located in a third array which is located on said second matrix, with each said energizing means being located in opposed relationship with the one of said first components corresponding to the second component with which the energizing means is associated.

7. An apparatus for producing character patterns comprising:

a first matrix located on a first substrate and having a plurality of selectively energizable first components arranged in a first matrix-type array for producing a plurality of matrix-type character patterns;

a second substrate having first and second connection terminals thereon for connection to a source of potential; and a second matrix located on said second substrate and having a plurality of selectively energizable second components arranged in a second array corresponding to said first array and adapted to be energized in a plurality of patterns corresponding to the patterns of the first matrix;

each said second component having associated therewith an energizing means for energizing it in response to the energization of the corresponding first component of the first matrix;

each said second component and its associated energizing means being series connected between said first and second connection terminals; and each said energizing means being located in a third array which is located on said second substrate, said first and second substrates being positioned in opposed relationship so that each said energizing means is opposite the one of said first components corresponding to the second component with which the energizing means is associated.

8. The improvement as claimed in claim 7 in which each said second component produces heat when energized so as to produce a mark on a thermally responsive record medium when placed in contact therewith.

* * * * *